US011909181B2

(12) United States Patent
Rumler et al.

(10) Patent No.: US 11,909,181 B2
(45) Date of Patent: Feb. 20, 2024

(54) COMPARTMENT FOR A MEDIUM VOLTAGE AIR OR GAS INSULATED SWITCHGEAR

(71) Applicant: ABB Schweiz AG, Baden (CH)

(72) Inventors: David Rumler, Kobylnice (CZ); Emil Kalina, Brno (CZ)

(73) Assignee: ABB Schweiz AG, Baden (CH)

( * ) Notice: Subject to any disclaimer, the term of this patent is extended or adjusted under 35 U.S.C. 154(b) by 437 days.

(21) Appl. No.: 17/159,191

(22) Filed: Jan. 27, 2021

(65) Prior Publication Data

US 2021/0234345 A1 Jul. 29, 2021

(30) Foreign Application Priority Data

Jan. 29, 2020 (EP) .................. 20 154 322

(51) Int. Cl.
*H02B 1/01* (2006.01)
*H02B 1/30* (2006.01)
*H02B 7/01* (2006.01)
*H02B 13/045* (2006.01)

(52) U.S. Cl.
CPC ............ *H02B 13/045* (2013.01); *H02B 1/01* (2013.01); *H02B 1/30* (2013.01); *H02B 7/01* (2013.01)

(58) Field of Classification Search
CPC .. H02B 13/045; H02B 13/02; H02B 13/0358; H02B 1/01; H02B 1/30; H02B 1/565; H02B 7/01; H05K 7/206
USPC ............ 218/155, 118, 134, 139; 200/50.17, 200/61.61; 361/612
See application file for complete search history.

(56) References Cited

U.S. PATENT DOCUMENTS

| | | | | |
|---|---|---|---|---|
| 8,680,421 | B2 * | 3/2014 | Hyrenbach | H01H 9/02 218/118 |
| 8,717,742 | B2 * | 5/2014 | Kim | H02B 13/035 361/620 |
| 9,516,784 | B2 * | 12/2016 | Pawar | H05K 7/20145 |
| 9,974,214 | B2 * | 5/2018 | Hamari | H05K 7/206 |
| 10,176,959 | B1 * | 1/2019 | Bhalla | H02B 1/04 |
| 10,230,221 | B2 * | 3/2019 | Wu | H02G 3/22 |
| 10,305,262 | B2 * | 5/2019 | Johnson | H02B 1/306 |

(Continued)

FOREIGN PATENT DOCUMENTS

CN 103427601 A 12/2013
DE 29912027 U1 9/1999

(Continued)

OTHER PUBLICATIONS

European Patent Office, Office Action in European Patent Application No. 20154322.0, 8 pp. (dated Oct. 9, 2023).

*Primary Examiner* — William A Bolton
(74) *Attorney, Agent, or Firm* — Leydig, Voit & Mayer, Ltd.

(57) ABSTRACT

A compartment for a medium voltage air or gas insulated switchgear includes: a plurality of walls. At least one wall of the plurality of walls is an external wall. The external wall is a first metal sheet. The external wall includes a plurality of conductive elements. A first surface of the first metal sheet is an outer surface for thermal contact with ambient air. A second surface of the first metal sheet is an inner surface for thermal contact with air or gas within the compartment. The plurality of conductive elements extend from the second surface of the first metal sheet into the compartment.

18 Claims, 7 Drawing Sheets

(56) References Cited

U.S. PATENT DOCUMENTS

| | | | |
|---|---|---|---|
| 2014/0131090 A1* | 5/2014 | Gingrich | H02B 1/565 174/560 |
| 2015/0229109 A1* | 8/2015 | Kutalek | H02B 13/02 312/223.1 |
| 2019/0260190 A1* | 8/2019 | Ma | H02B 13/025 |

FOREIGN PATENT DOCUMENTS

| | | |
|---|---|---|
| DE | 102008053958 A1 | 5/2010 |
| EP | 3483995 A1 | 5/2019 |
| WO | WO 9106995 A1 | 5/1991 |
| WO | WO 2017162542 A1 | 9/2017 |

* cited by examiner

COMPARTMENT FOR A MEDIUM VOLTAGE AIR OR GAS INSULATED SWITCHGEAR

CROSS-REFERENCE TO PRIOR APPLICATION

Priority is claimed to European Patent Application No. EP 20 154 322.0, filed on Jan. 29, 2020, the entire disclosure of which is hereby incorporated by reference herein.

FIELD

The present invention relates to a compartment for a medium voltage air or gas insulated switchgear, and to a medium voltage air or gas insulated switchgear comprising such a compartment.

BACKGROUND

One of the critical performance criteria of air or gas insulated switchgear is the ability to conduct rated busbar and/or t-off current(s) without overheating any component of the switchgear above the temperature rise limit given by the standard and/or the design of such components.

In the switchgear, ohmic and other power losses in the current path release heat. That heat increases the temperature of the current path and other structures of the switchgear. This temperature rise is limited by standards and/or by component limits.

High temperatures also contribute to the aging of construction materials, e.g. insulation.

There is a need to address these issues.

SUMMARY

In an embodiment, the present invention provides a compartment for a medium voltage air or gas insulated switchgear, the compartment comprising: a plurality of walls, wherein at least one wall of the plurality of walls comprises an external wall, wherein the external wall comprises a first metal sheet, wherein the external wall comprises a plurality of conductive elements, wherein a first surface of the first metal sheet comprises an outer surface that is configured to be in thermal contact with ambient air, wherein a second surface of the first metal sheet comprises an inner surface that is configured to be in thermal contact with air or gas within the compartment, and wherein the plurality of conductive elements extend from the second surface of the first metal sheet into the compartment.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
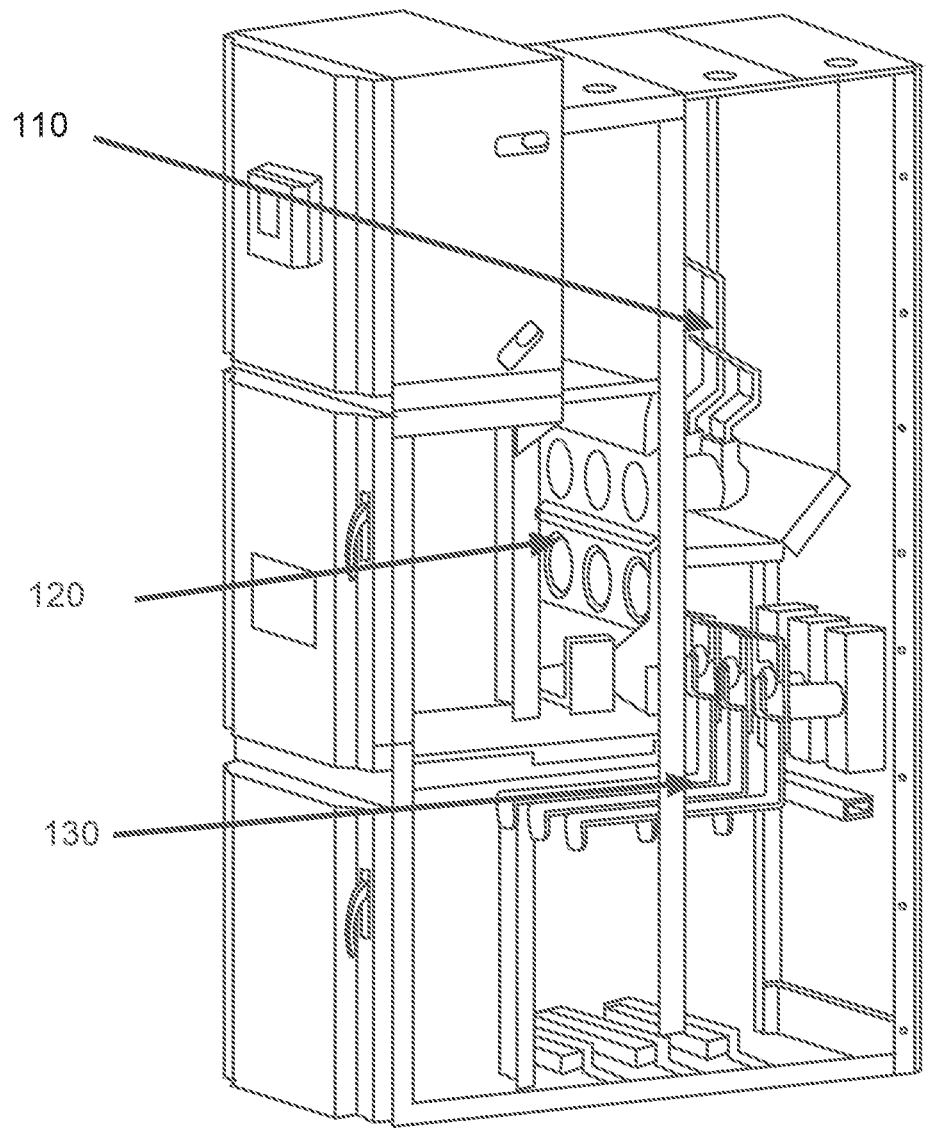
FIG. 1 shows a schematic representation of an example of a compartment for a medium voltage air or gas insulated switchgear.

In an embodiment, the present invention provides an improved technique to provide cooling for a compartment of a medium voltage air or gas insulated switchgear.

It is to be noted that the compartment is described with respect to a medium voltage air or gas insulated switchgear, but finds utility in other compartments situations housing heat generating components.

In an aspect, there is provided a compartment for a medium voltage air or gas insulated switchgear, the compartment comprising:

a plurality of walls.

At least one wall of the plurality of walls is an external wall. The external wall comprises a first metal sheet. The external wall comprises a plurality of conductive elements. A first surface of the first metal sheet is an outer surface that is configured to be in thermal contact with ambient air. A second surface of the first metal sheet is an inner surface that is configured to be in thermal contact with air or gas within the compartment. The plurality of conductive elements extend from the second surface of the first metal sheet into the compartment.

In an example, the plurality of conductive elements are in thermal contact with the first metal sheet.

In an example, the plurality of conductive elements extend from the first surface of the first metal sheet and are configured to be in thermal contact with the ambient air.

In an example, the external wall comprises a second metal sheet. The second metal sheet is spaced from the first metal sheet. A first surface of the second metal sheet faces the second surface of the first metal sheet. The plurality of conductive elements extend from the first surface of the second metal sheet.

In an example, the plurality of conductive elements are in thermal contact with the second metal sheet.

In an example, a second surface of the second metal sheet is on an opposite side of the second metal sheet to the first surface of the second metal sheet. The plurality of conductive elements extend from the second surface of the second metal sheet.

In an example, the plurality of conductive elements are separated into two or more parts of the external wall.

In an example, the two or parts of the external wall are separated vertically, horizontally or diagonally.

In an example, each of the two or more parts are configured to align with one or more elements of each phase of two or more phases of the switchgear.

In an example, the plurality of conductive elements maintain a separation between the first metal sheet and the second metal sheet.

In an example, the first metal sheet and the plurality of conductive elements are formed from a single piece of metal.

In an example, the external wall is formed from a single piece of metal.

In an example, the plurality of conductive elements extend through a corresponding plurality of holes in the first metal sheet.

In an example, the plurality of conductive elements extend through a corresponding plurality of holes in the second metal sheet.

In a second aspect, there is provided a medium voltage air or gas insulated switchgear, comprising:

a compartment according to the first aspect; and two or more phases.

One or more components of each of the two or more phases are housed in the compartment.

The above aspects and examples will become apparent from and be elucidated with reference to the embodiments described hereinafter.

FIGS. 1-7 relate to compartment for a medium voltage air or gas insulated switchgear. According to an example, the compartment comprises a plurality of walls. At least one wall of the plurality of walls is an external wall. The external wall comprises a first metal sheet. The external wall comprises a plurality of conductive elements. A first surface of the first metal sheet is an outer surface that is configured to be in thermal contact with ambient air. A second surface of the first metal sheet is an inner surface that is configured to be in thermal contact with air or gas within the compartment. The plurality of conductive elements extend from the second surface of the first metal sheet into the compartment.

According to an example, the plurality of conductive elements are in thermal contact with the first metal sheet.

According to an example, the plurality of conductive elements extend from the first surface of the first metal sheet and are configured to be in thermal contact with the ambient air.

According to an example, the external wall comprises a second metal sheet. The second metal sheet is spaced from the first metal sheet. A first surface of the second metal sheet faces the second surface of the first metal sheet. The plurality of conductive elements extend from the first surface of the second metal sheet.

According to an example, the plurality of conductive elements are in thermal contact with the second metal sheet.

According to an example, a second surface of the second metal sheet is on an opposite side of the second metal sheet to the first surface of the second metal sheet. The plurality of conductive elements extend from the second surface of the second metal sheet.

According to an example, the plurality of conductive elements are separated into two or more parts of the external wall.

According to an example, the two or parts of the external wall are separated vertically, horizontally or diagonally.

According to an example, each of the two or more parts are configured to align with one or more elements of each phase of two or more phases of the switchgear.

According to an example, the plurality of conductive elements maintain a separation between the first metal sheet and the second metal sheet.

According to an example, the first metal sheet and the plurality of conductive elements are formed from a single piece of metal.

According to an example, the external wall is formed from a single piece of metal.

According to an example, the plurality of conductive elements extend through a corresponding plurality of holes in the first metal sheet.

According to an example, the plurality of conductive elements extend through a corresponding plurality of holes in the second metal sheet.

From the above it is clear that the compartment as described above can be part of a medium voltage air or gas insulated switchgear. The switchgear can have two or more phases. For example it can be a three phase system. One or more components of each of the two or more phases are housed in the compartment.

In an example, the one or more components of each of the two phases or more are aligned with different parts of the external wall of the compartment having separated conductive elements.

Continuing with the figures, as shown in FIG. 1 in a compartment for a medium voltage air or gas insulated switchgear cooling is important because significant amounts of heat is released during operation. The main sources of heat are the busbars and T-off joints 110, and the circuit breaker or breakers and circuit breaker contacts 120, and current transformers and cable terminals 130. The new compartment design described here enables improved heat dissipation leading to increased available (nominal) continuous current rating, and the improved cooling enables higher permissible load and/or possible savings on current path materials.

Figure 2:
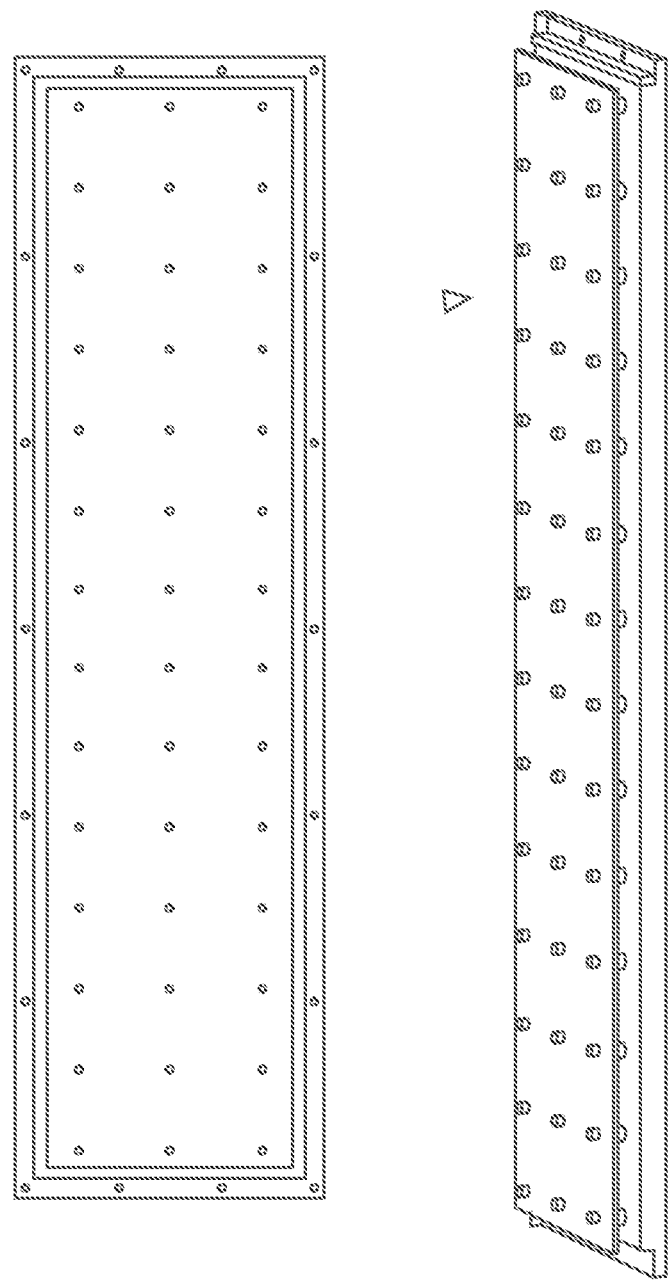
FIG. 2 shows a schematic representation of two views of an external wall of a compartment for a medium voltage air or gas insulated switchgear.
Figure 3:
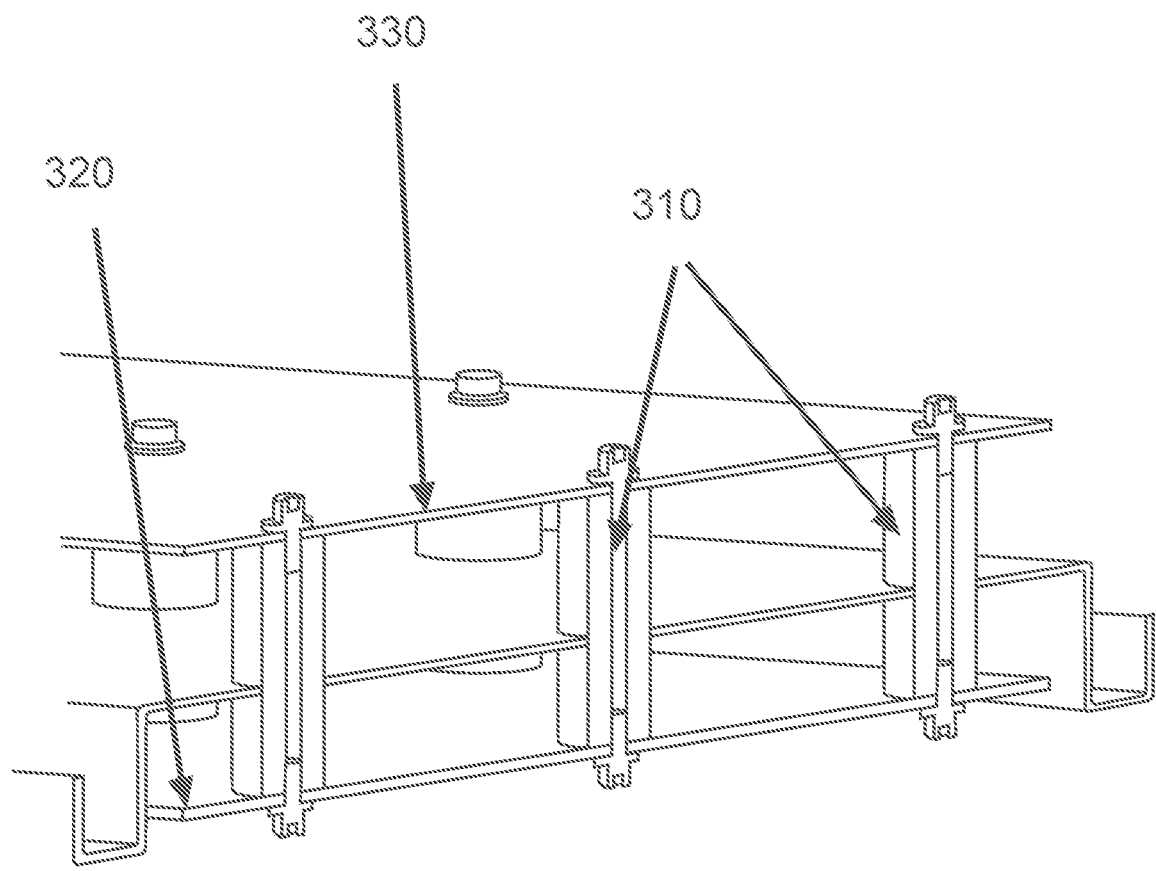
FIG. 3 shows a schematic representation of an external wall of a compartment for a medium voltage air or gas insulated switchgear.

As shown in FIGS. 2-3, the new compartment design has a new external wall, such as a rear wall. This provides for improved cooling of the instrument transformer, and also enables improved cooling of the busbar and circuit breaker compartments. The new wall has two heat-conductive metal sheets 320 and 330 that are connected with heat-conductive elements 310. These elements 310 transfer heat from inside of the switchgear to the outside. The inner metal sheet 320 also improves the panel behaviour in the situation where there is an internal arc failure by shielding the rear wall structure. The new wall is also structurally stronger than existing walls and the heat conductive elements 310 can extend through holes in the inner or outer wall sections of the external wall, but the dual walled structure compensates for such holes in the external wall.

Figure 4:
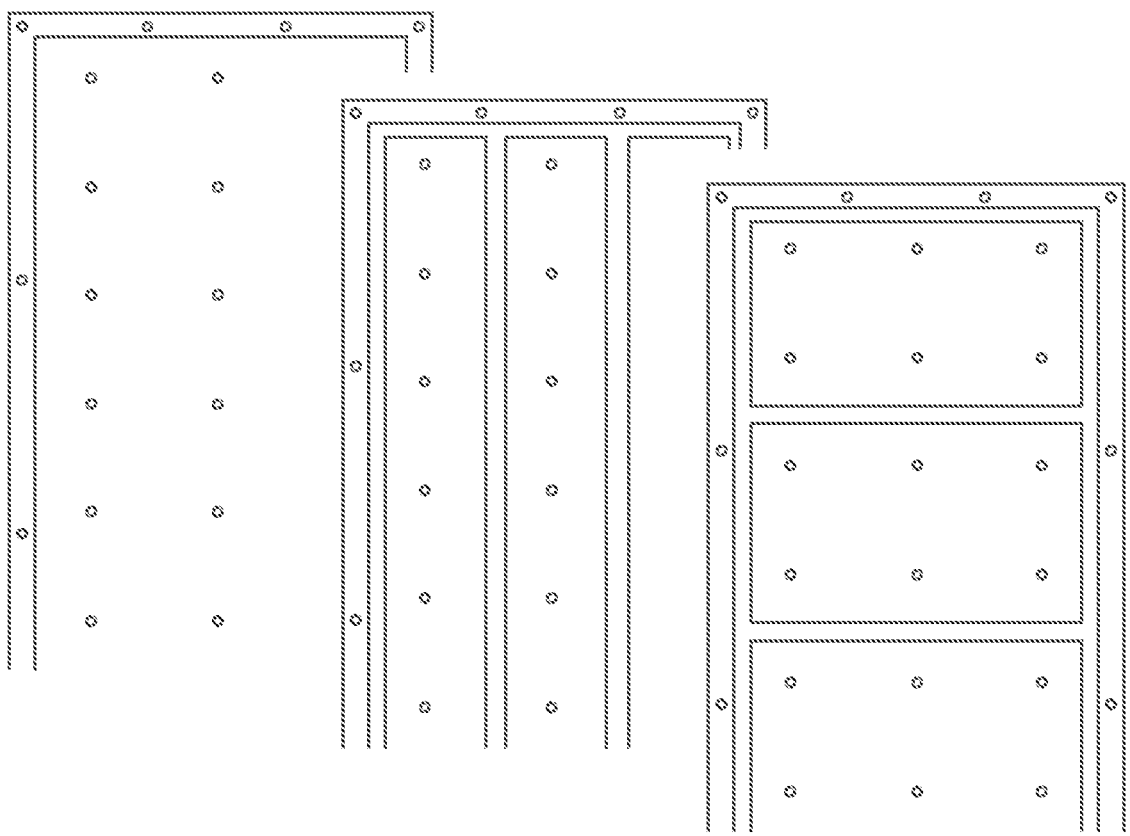
FIG. 4 shows schematic representations of three external walls of compartments for medium voltage air or gas insulated switchgear.
Figure 5:
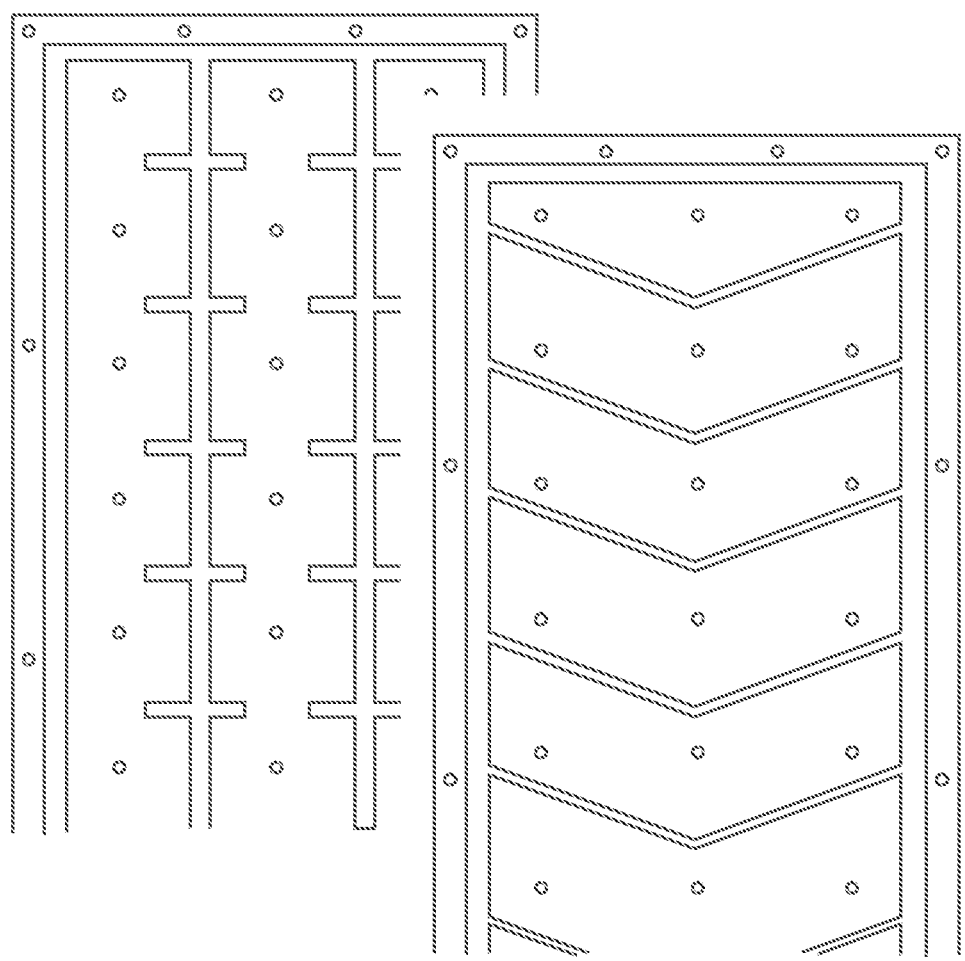
FIG. 5 shows schematic representations of two external walls of compartments for medium voltage air or gas insulated switchgear.
Figure 6:
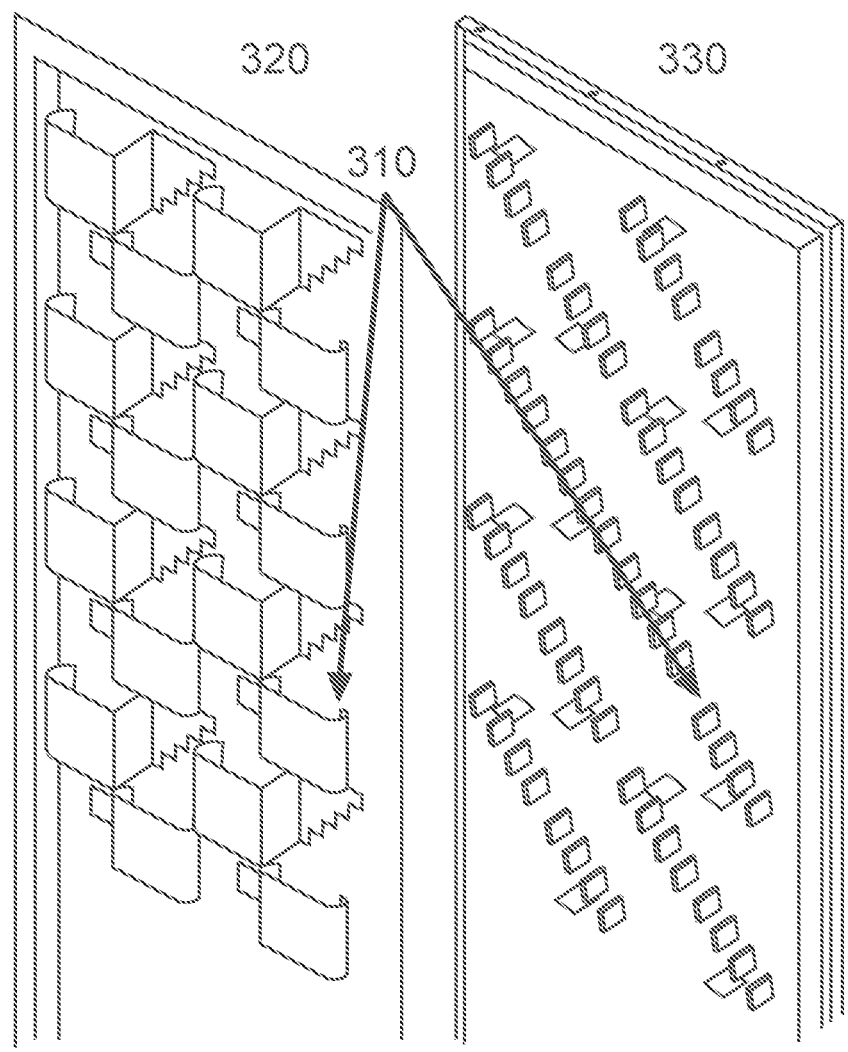
FIG. 6 shows schematic representations of two external walls of compartments for medium voltage air or gas insulated switchgear.
Figure 7:
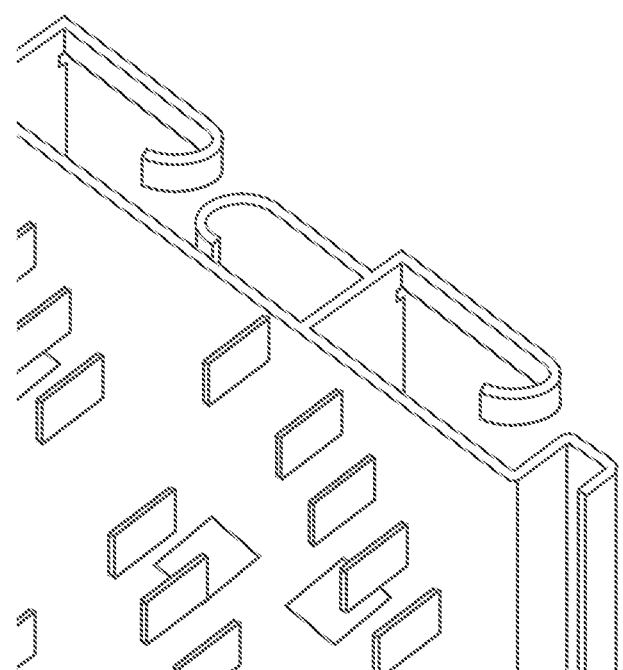
FIG. 7 shows a schematic representation of an external wall of a compartment for a medium voltage air or gas insulated switchgear.

As shown in FIGS. 4-7, the conductive metal sheet can be configured to come in a number of variants. As shown in FIG. 4 it can come with the conductive elements 310 arranged in one part has illustrated in the left panel in FIG. 4), or the conductive elements 310 can be separated or split into two or three parts (as illustrated in the center and right panels in FIG. 4, and the left and right panels in FIG. 5) to align with internal parts of switchgear. Thus, the conductive elements can be split vertically, horizontally or diagonally. These arrangements are to improve airflow and heat exchange. The conductive element variants can go through the external wall, and be split with up in order to maintain the distance of the conductive metal sheet inner from external wall outer sheet. The conductive elements 310 can themselves be part of the conductive metal sheet (forming a one piece solution, as illustrated in FIGS. 6 and 7).

In this way, the new wall design improves cooling of the switchgear by increasing the energy flow through the external wall (such as rear wall) of the switchgear providing a temperature drop over that with respect to a compartment without the new design of wall or walls, whilst maintaining mechanical strength of the external wall structure.

In essence the inventors realised that for example in a switchgear compartment (such as cable compartment), heat is exchanged with the surrounding environment in several ways, with one of them being through the metal external-wall (e.g. rear wall), which has usually large area, and that this heat transfer could be improved with a new design of external wall.

With the new wall design, power flow through the external wall (e.g. rear wall) is improved through utilisation of increased areas of heat-exchanging surfaces on both the inside and outside of the external wall. The heat can flow through the wall using material with better thermal conductivity compared to the wall steel material itself. However, the wall and conductive elements can be formed from one-piece if required. The holes for the conductive elements do not compromise the wall strength in any significant way with respect to its mechanical properties, e.g. for the internal arc test.

Thus, in summary there are two heat-exchanging sheet metals, connected by heat-conductive elements. The sheet metals can be in one piece, divided in horizontal, vertical or other ways. The sheet metal and conductive elements can be replaced with a one piece solution, where both internal and external metal sheets and conductive elements are replaced with, or formed from, one piece of material. The new design is based on a development of current external (e.g. rear) wall designs for switchgear compartments. To the external wall, additional thermal-conductive elements are fixed so the elements in the switchgear take the heat from the hot air inside and conduct it to the external thermal-conductive elements which heat outside air, thereby cooling the inside of the compartment. The conductive elements are fixed in order to maintain a proper, or required, distance between the two metal sheets. These conductive elements can be of various sizes and appearances.

Each external wall of the compartment can be formed of the new wall design.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A compartment for a medium voltage air or gas insulated switchgear, the compartment comprising:
   a plurality of walls,
   wherein at least one wall of the plurality of walls comprises an external wall,
   wherein the external wall comprises a first metal sheet,
   wherein the external wall comprises a plurality of conductive elements,
   wherein a first surface of the first metal sheet comprises an outer surface that is configured to be in thermal contact with ambient air,
   wherein a second surface of the first metal sheet comprises an inner surface that is configured to be in thermal contact with air or gas within the compartment, and
   wherein the plurality of conductive elements extend from the second surface of the first metal sheet into the compartment,
   wherein the plurality of conductive elements extend through a corresponding plurality of holes in the first metal sheet.

2. The compartment according to claim 1, wherein the plurality of conductive elements are in thermal contact with the first metal sheet.

3. The compartment according to claim 1, wherein the plurality of conductive elements extend from the first surface of the first metal sheet and are configured to be in thermal contact with the ambient air.

4. The compartment according to claim 1, wherein the external wall comprises a second metal sheet,
   wherein the second metal sheet is spaced from the first metal sheet,
   wherein a first surface of the second metal sheet faces the second surface of the first metal sheet, and
   wherein the plurality of conductive elements extend from the first surface of the second metal sheet.

5. The compartment according to claim 4, wherein the plurality of conductive elements are in thermal contact with the second metal sheet.

6. The compartment according to claim 4, wherein a second surface of the second metal sheet is on an opposite side of the second metal sheet than the first surface of the second metal sheet, and
   wherein the plurality of conductive elements extend from the second surface of the second metal sheet.

7. The compartment according to claim 4, wherein the plurality of conductive elements maintain a separation between the first metal sheet and the second metal sheet.

8. The compartment according to claim 4, wherein the plurality of conductive elements extend through a corresponding plurality of holes in the second metal sheet.

9. The compartment according to claim 1, wherein the plurality of conductive elements are separated into two or more parts of the external wall.

10. The compartment according to claim 9, wherein the two or more parts of the external wall are separated vertically, horizontally, or diagonally.

11. The compartment according to claim 9, wherein each of the two or more parts of the external wall are configured to align with one or more elements of each phase of two or more phases of the switchgear.

12. The compartment according to claim 1, wherein the first metal sheet and the plurality of conductive elements comprise a single piece of metal.

13. The compartment according to claim 1, wherein the external wall comprises a single piece of metal.

14. A medium voltage air or gas insulated switchgear, comprising:
   the compartment according to claim 1; and
   two or more phases, wherein one or more components of each of the two or more phases are housed in the compartment.

15. A compartment for a medium voltage air or gas insulated switchgear, the compartment comprising:
a plurality of walls,
wherein at least one wall of the plurality of walls comprises an external wall,
wherein the external wall comprises a first metal sheet,
wherein the external wall comprises a plurality of conductive elements,
wherein a first surface of the first metal sheet comprises an outer surface that is configured to be in thermal contact with ambient air,
wherein a second surface of the first metal sheet comprises an inner surface that is configured to be in thermal contact with air or gas within the compartment, and
wherein the plurality of conductive elements extend from the second surface of the first metal sheet into the compartment,
wherein the external wall comprises a second metal sheet,
wherein the second metal sheet is spaced from the first metal sheet,
wherein a first surface of the second metal sheet faces the second surface of the first metal sheet,
wherein the plurality of conductive elements extend from the first surface of the second metal sheet, and
wherein the plurality of conductive elements extend through a corresponding plurality of holes in the second metal sheet.

16. The compartment according to claim 15, wherein the plurality of conductive elements are in thermal contact with the second metal sheet.

17. The compartment according to claim 15, wherein a second surface of the second metal sheet is on an opposite side of the second metal sheet than the first surface of the second metal sheet, and
wherein the plurality of conductive elements extend from the second surface of the second metal sheet.

18. The compartment according to claim 15, wherein the plurality of conductive elements maintain a separation between the first metal sheet and the second metal sheet.

* * * * *